(12) United States Patent
Poulsen (10) Patent No.: US 8,845,248 B2
(45) Date of Patent: Sep. 30, 2014

(54) TRANSPORT STRUCTURE AND METHODS FOR TRANSPORTING AND/OR LIFTING A LARGE SCALE GENERATOR

(75) Inventor: Henning Poulsen, Skjern (DK)

(73) Assignee: Siemens Aktiengesellschaft, Munich (DE)

( * ) Notice: Subject to any disclaimer, the term of this patent is extended or adjusted under 35 U.S.C. 154(b) by 106 days.

(21) Appl. No.: 13/359,518

(22) Filed: Jan. 27, 2012

(65) Prior Publication Data

US 2012/0171007 A1 Jul. 5, 2012

(30) Foreign Application Priority Data

Jan. 2, 2011 (EP) ..................................... 11152923

(51) Int. Cl.
*B60P 3/42* (2006.01)
*B60P 3/00* (2006.01)
*B62D 63/08* (2006.01)
*B60P 3/40* (2006.01)

(52) U.S. Cl.
CPC ........................................ *B60P 3/40* (2013.01)
USPC .................... 410/44; 410/2; 414/800; 280/30

(58) Field of Classification Search
USPC ................. 410/44–47, 34, 53, 101, 2, 82, 35; 108/55.3, 55.5; 416/244 R; 428/29
See application file for complete search history.

(56) References Cited

U.S. PATENT DOCUMENTS

| 3,334,840 | A | * | 8/1967 | Vander Pyl et al. | ........ 242/118.7 |
| 3,605,638 | A | * | 9/1971 | James | ............... 410/49 |
| 3,654,875 | A | * | 4/1972 | Vik | ................ 108/53.1 |
| 5,231,808 | A | * | 8/1993 | Angelette | ..................... 52/122.1 |
| 5,829,363 | A | * | 11/1998 | Reilly | ........................ 108/55.1 |
| 7,475,796 | B2 | * | 1/2009 | Garton | ........................ 222/185.1 |
| 7,775,753 | B2 | * | 8/2010 | Pedersen | ........................ 410/44 |
| 8,336,465 | B2 | * | 12/2012 | Poulsen et al. | ............... 108/55.1 |
| 2005/0002749 | A1 | | 1/2005 | Andersen | |
| 2011/0304122 | A1 | * | 12/2011 | Poulsen | ....................... 280/404 |

FOREIGN PATENT DOCUMENTS

| DE | 202005011953 U1 | 11/2006 |
| DE | 202009010393 U1 | 12/2009 |
| FR | 1564669 A | 4/1969 |
| WO | WO 2010066255 A1 | 6/2010 |

* cited by examiner

*Primary Examiner* — Glenn Dayoan
*Assistant Examiner* — Sunsurraye Westbrook

(57) ABSTRACT

A transport structure for transporting and/or lifting a large scale generator, in particular a generator of a wind turbine is disclosed. A handling base is included with an upper side and a lower side and a first longitudinal end and second longitudinal end, and an interface arrangement at the handling base realized such that a generator can be releasably attached to the handling base in the direction of the upper side. A method for transporting and for lifting a large scale generator is disclosed.

16 Claims, 4 Drawing Sheets

FIG 9

TRANSPORT STRUCTURE AND METHODS FOR TRANSPORTING AND/OR LIFTING A LARGE SCALE GENERATOR

CROSS REFERENCE TO RELATED APPLICATIONS

This application claims priority of European Patent Office application No. 11152923.6.7 EP filed Feb. 1, 2011. All of the applications are incorporated by reference herein in their entirety.

FIELD OF INVENTION

The present invention concerns a transport structure for transporting and/or lifting a large scale generator, in particular a generator of a wind turbine. It also concerns methods for transporting and for lifting such generator.

BACKGROUND OF INVENTION

Large scale generators often need to be transported from their point of manufacture to their point of the final assembly and later operation. For instance, generators for wind turbines will be manufactured locally and then transported from there to different locations of operation. These locations of operation include both onshore and offshore locations, so that it is sometimes necessary to transport the generators both at land and at sea.

SUMMARY OF INVENTION

On the one hand, such a large scale generators which usually have a weight of several tons constitute very large entities. This means that a suitable means of transport needs to be found which caters for the large size of the generators. On the other hand, these generators include a lot of electric and electronic components which need to be protected. That implies that it needs to be ensured that no damage to the single components within the generator and also to the outside of the generator will be done accidentally.

For instance, a so-called direct drive generator of a wind turbine has a weight of approximately 60 t and a diameter of several meters. That implies that such generators are difficult to handle due to their size both when stored and when transported and also when finally installed on the wind turbine of destination. It also has to be taken into account, that transporting such a generator is often carried out by different means of transport. For example, if a generator is to be installed on an offshore wind turbine that implies that it will be transported by means of land transport from its location of production to a port and from the port by ship to its offshore destination.

Today such generators are simply lifted onto and lashed with chains to a means of transport such as a ship or a truck or any other vehicle. Such lashing chains may cause damage to the outside surface of the generator and, in addition, lashing also permits for a certain range of movement due to vibrations during transport. Both these factors can cause damages to the generator, both from its outside and on its inside.

Another problem directly connected to the transport of large scale generators is how to put them into an assembly position once they arrive at the site of assembly. For instance, generators for large wind turbines need to be lifted high above ground and need to be turned from a transport position in which their axis is orientated vertically to an assembly position in which their axis is orientated horizontally. So far this was accomplished by taking the generator from the means of transport by means of chains or the like and to turn the generator around once it was high enough in the air. However, this procedure implies a certain degree of uncontrollable movements of the generator with respect to the chains which again may cause damages to the generator.

It is therefore the object of the invention to provide for possibilities of a safer transport and/or lifting of large scale generators.

This object is met by a transport structure and by methods according to the independent claims.

Thus, a transport structure according to the invention comprises at least:
  a handling base, which is preferably essentially flat, with an upper side and a lower side and a first longitudinal end and a second longitudinal end,
  an interface arrangement at the handling base realized such that a generator can be releasably attached to the handling base in the direction of the upper side.

Such a handling base, for instance a frame structure, as is used as the basis of the transport structure may just be made up of a number of beams which are interconnected. This way they can form a solid and stable structure which is realized such that it can carry the weight of the generator to be transported. However, the handling base may e.g. also comprise a plane, alone or in combination with supporting beams, onto which the generator can be placed. Such plane may form the surface on the upper side and/or on the lower side of the handling base.

In order to be utilizable for the purpose of transport of generators this transport structure is equipped with an interface arrangement. Such an interface arrangement preferably corresponds in shape and/or size (preferably in both) with an interface side of the generator which is to be transported. This means that at the side at which the generator is brought into contact with the transport structure, the corresponding interface arrangement of the transport structure is supplied. This interface arrangement is realized such that it serves to connect and to releasably fix the generator to the handling base. For instance, the generator and the interface arrangement can be brought into form fit, but at least in to some physical contact and then be firmly connected for the duration of the transport and/or of the lifting of the generator.

It may be noted that the interface arrangement is preferably permanently connected to the handling base. However, it is also possible to use an interface arrangement which is attached to the handling base on a non-permanent basis and which can be readily taken off the handling base in case the handling base is needed for other purposes as well. In this case the interface arrangement can be considered to be a kind of adaptor for equipping a standard handling base, such as a frame with longitudinal beams and cross beams, and thus to transform it into a transport structure according to the invention.

To sum up in other words, an interface arrangement connected to the handling base is supplied which ensures a firm connection between the generator and the transport structure so that the transport structure and the generator together constitute an entity of its own, namely a transport assembly.

Therefore, the invention also concerns a transport assembly comprising a transport structure according to the invention and a large scale generator, in particular a generator of a wind turbine, attached to the transport structure via the interface arrangement.

Such transport assembly can then be transported by virtually any kind of means of transport. For instance, it can be placed on board of a ship or into an aircraft. It can also be connected to chains leading to a crane or a helicopter and certainly it can be transported by means of land transport, in particular by road vehicles. For that purpose it is particularly advantageous to build up a transport system comprising the transport assembly according to the invention and a tractor (directly or indirectly) attached to the first longitudinal end of the handling base. Such tractor may be a locomotive but also a truck master. The tractor is preferably supplied with a raising means realized such that it can raise the transport structure at its first longitudinal end. Preferably at the second longitudinal end rollers are supplied, so that the tractor combined with the transport assembly and the rollers constitutes a vehicle with a dolly and a transport plane in between. Such rollers are preferably realized such that they keep the second longitudinal end of the transport structure above ground as well so that the wheels of the tractor together with the rollers at the second longitudinal end carry the transport structure above ground.

Concerning the method for transporting a large scale generator according to the invention, this is realized by attaching the generator to a transport structure via an interface arrangement of the transport structure in the direction of an upper side of the transport structure and by moving the transport structure. Preferably for this purpose a transport structure according to the invention is used so that it is made sure that the generator is firmly fixed to the transport structure by means of the interface arrangement.

Concerning the method for lifting a large scale generator, this is realized by attaching the generator to a transport structure via an interface arrangement of the transport structure in the direction of an upper side of the transport structure and by moving the transport structure from a position in which its main extension is essentially orientated in a horizontal way into a position in which its main extension is essentially orientated in a vertical way. That implies that not only the generator itself is brought into an assembly position during lifting but also the transport structure, which is still connected to the generator. This means that chains or lashes need not necessarily be attached to the generator itself, but can rather be connected to the transport structure instead. This way there is no connection between the chains and the generator so that the danger of damaging the generator during the lifting procedure is substantially reduced. Such a lifting procedure is particularly advantageous in the connection with the transport method according to the invention: once the generator has been connected to the transport structure it can be transported by any kind of means of transport on the transport structure without being removed from it at any time. Even during the preparation of assembly of the generator in its assembly position, for instance in a wind turbine, it still is connected to the same transport structure which now serves as a kind of carrier or intermediate between chains or other parts connected to a lifting device and the generator. Thus, the user of such transport structure in the context of both transporting and lifting the generator has the positive effect of reduced time, effort and costs for transport and assembly of the generator. One can conclude that once the connection between the generator and the transport structure has been established it will not be loosened until the generator is assembled at its point of destination. This connection can be established right after the end of construction of the generator, but also before that: during the construction the transport structures may already serve as kinds of platforms in the context of an assembly line.

The point of destination is preferably a wind turbine, in particular a large wind turbine with a maximum power output of at least 100 KW, preferably of at least 2 MW, most preferred of at least 5 MW. Connected to an assembly in such wind turbines there firstly is the problem that the generators have to be lifted very high above ground, i.e. about 60 m or more, so that lifting the generator is particularly difficult. Secondly such wind turbines require very large generators so that the transport of these generators is particularly difficult as well. Thirdly, generators for wind turbines have particularly high requirements concerning their reliability: due to the great effort needed for transporting and lifting generators for assembly in a wind turbine, an exchange if such a generator should not work properly is particularly tedious and costly as well. Therefore, it is a highly critical task to avoid critical transport damages or damages during lifting the generator to the wind turbine. The transport structure according to the invention which ensures a substantial reduction of danger of damage to the generator in comparison with the state of the art is therefore highly advantageous in particular for wind turbine generators.

Generators for wind turbines can be so-called direct drive generators or a indirect drive generators. In the case of an indirect drive generator a drivetrain from a rotor of the wind turbine is divided into at least two parts one part of which leads from the rotor into a gearbox which transforms the rotation movement from the rotor into a faster rotation movement of the second part of the drivetrain. The second part of the drivetrain is then connected to the generator. This implies that the rotation speed of the second part of the drivetrain is substantially higher than the rotation speed of the rotor and of the first part of the drivetrain. Such indirect drive generators are usually smaller than direct drive generators in which rotational energy of the rotor is virtually directly transformed into electric energy via a drivetrain which directly connects the rotor and the generator. There is no use made of a gearbox, and thus the wind turbine is a so-called gearless wind turbine. Thus, a particular focus is directed at the transport and lifting of direct drive generators in the context of the invention because of their size. To conclude, both methods according to the invention, in particular the method for lifting a large scale generator, are preferably characterized by the fact that the generator is a direct drive generator of a gearless direct drive wind turbine.

Particularly advantageous embodiments and features of the invention are given by the dependent claims, as revealed in the following description. Thereby, features revealed in the context of the transport structure may also be realized in the context of the methods and vice versa.

As for the interface arrangement, it is preferred that it comprises fittings and/or holes and/or adaptor shapes which correspond in shape and/or position to a shape and/or position of the generator to be transported at an interface side of the generator facing towards the upper side of the handling base. An adaptor shape may project into the direction of the generator or be realized as a recess in a surface of the transport structure into which parts of the generator can be inserted. The adaptor's shape can also be a combination of both of these principles. Holes can be used for inserting bolts to firmly fix the generator in a certain fixing location of the transport structure. Fittings may comprise devices such as clamps, blocks or rings or similar devices with which fixing of the generator to the transport structure is made possible. These possible elements of the interface arrangement are located in an interface region in which the generator comes into proximity or contact with the transport structure. In this sense, the interface arrangement is first defined by its location with respect to the placement of the generator and secondly by interface arrangement means such as the fittings, the holes or the adaptor shapes mentioned above. It may be noted, that additional interface arrangement means can be used any of which serve to position and/or to directly or indirectly fix the generator on the transport structure. Additional fixing means outside the interface region may also be used as supporting means for stabilization.

Some aspects relating to the generator which is to be placed onto the transport structure shall be mentioned briefly. Firstly, the size and outline of the generator will define the size and outline of the transport structure. For instance, it is preferred that the extension of the transport structure in any horizontal direction (in a transport position) is larger than ⅓, most preferably at least ½ and most preferred ¾, of the diameter of the generator in the same direction when placed onto the transport structure. The horizontal extension in both the longitudinal and cross direction of the transport structure may be different, but they may also be (approximately) the same so that in this case a square (or almost square) structure is defined. To conclude, the size of the generator serves to define the dimensions of the transport structure. Secondly, the interface arrangement of the transport structure is adapted to cater for a film fixing of that very generator, i.e. of a number of generators of the same type. This particular adaption is realized by defining one outside surface of the generator as the contact surface or as the interface side which will be brought into contact with the transport structure. Preferably in the context of wind turbine generators, the interface side will be that side of the generator which faces away from the wind turbine's nacelle during assembly. In other words, the interface side is that side of the generator directed to the rotor or hub side of the wind turbine. Thirdly, the generator is connected to the transport structure. For that purpose, holes or openings of the generator which are existent anyway can be used and hole or fitting on the side of the transport structure must be positioned accordingly. If there are not enough such hole or openings in the generator at the interface side or if additional or different fixing methods are preferred, fittings must be positioned in the interface arrangement such that their position and function corresponds with that region of the interface side of the generator to which they will be attached.

The handling base can virtually be made up of any kind of elements serving to establish a stable carrier structure, for example one or several metal plates. It is preferred that the handling base comprises at least one longitudinal beam and at least one cross beam orientated in an essentially perpendicular way to the longitudinal beam. These two beams are interconnected and can thus constitute a stable carrier structure, if wished for in combination with other elements such as metal plates etc. Using such beam structure based on at least one longitudinal beam and one cross beam serves to establish a reasonably stable handling base with low effort and costs. Preferably there are at least two longitudinal beams and/or two cross beams, most preferred is a combination of at least two longitudinal beams and at least two cross beams which then can all be placed in the region of the edges of the handling base to essentially define its limits. The longitudinal and or cross beam(s) can be realized as a metal beam(s), for instance in an H shape in their cross section. The longitudinal and cross beam(s) can be connected in such way that a forklift can be placed underneath them or within their cross sectional shape. This facilitates raising the transport structure by a forklift. However, a forklift can also be placed inside of specially designated holes within any of the mentioned beams or in to any other orifices in the handling base.

A particular focus for facilitating transport of the transport arrangement is given to the size of the handling base and in effect of the transport arrangement overall. For that purpose it is preferred that the handling base is essentially sized like a base of a standard transport container, preferably according to ISO 668 (which is hereby incorporated as a whole in this description), such as 20 ft standard transport container or a 40 ft standard transport container according to ISO 668. This implies that the extension of the handling base in both the longitudinal and the cross direction is about the extension of such a standard container at its base. At least the extensions may not be above those of the extensions of the standard container and preferably they do not vary more than 10% from such a standard container. This has the effect that the transport structure can be used in a similar way as standard transport container, i.e. placed into a field on a container ship designated for a standard container or connected to a truck which is adapted to transport standard containers. Furthermore, the effect is that there is a certain additional protection to the generator if it does not extend beyond the extension of typical other transport goods at least in one horizontal extension: in such case it is highly improbable that it would be damaged by neigbouring containers (in the same extension in which those limits are respected) which are loaded onto the same ship or on any other means of transport at the same time as the generator. Once a standard container is placed beside the transport assembly it may collide with the transport structure but will not collide with the generator at the same time. In this context is also preferred that connecting means are realized in a region of the handling base in analogy to a standard container so that fixing the handling base to e.g. a ship is done in essentially the same manner as fixing a standard container to a ship or any other means of transport.

As mentioned before, the transport structure is preferably used in the context of a transport system. For that purpose it is preferred that the transport structure has attached a set of rollers or wheels at its second longitudinal end. A set of rollers may comprise one single roller or several rollers interconnected by one axle and/or with a common axis and/or with axes which are oriented in a parallel way. This way it is made possible that the transport structure can be pulled at the first longitudinal end while it rests on the rollers at its second longitudinal end. Most preferably these rollers comprise wheels realized in such a way that they can be used in the context of land transport.

In this context it is further preferred that the set of rollers is attached detachably directly or indirectly to the handling base. That means that the rollers are attached to the transport structure for the purpose of land transport, in particular land transport, whereas during other times it can be safely placed on ground, for example on the transport plane of ship or the like. In such circumstances the rollers could constitute an obstacle and could also leave the transport structure in a position in which its main extension is not parallel to the ground. Such a position might be damaging to the generator in the long run which is the reason why it is preferred to take off the rollers in a resting position.

Also for land transport it is advantageous if at the first longitudinal end of the transport structure there is an interface for attachment of the handling base to a tractor. As mentioned above, a truck master or a similar transport means can pull the handling base so that the transport structure itself need not be equipped with a motor unit of its own. The interface for the attachment to a tractor therefore serves to supply the possibility of a releasable connection between a tractor and the transport structure. Establishing a releasable connection also implies that the transport structure can be taken off the tractor again, e.g. for sea transport.

It is also preferred that the transport structure comprises connecting means for connecting the handling base directly or indirectly to a lifting device such as a crane or a helicopter.

That connecting means may comprise one or several holes and/or fittings which are positioned such that chains or ropes leading to the lifting device can be attached to the transport structure in such a way that a stable lifting process can be realized. Therefore, it is particularly advantageous to have at least three such connecting means, preferably at least for, which latter are advantageously arranged symmetrically such that during a lifting processors the transport structure is not in danger of tilting away uncontrollably.

For that purpose it has proven to be highly effective if the connecting means are situated in regions of corners of the handling base. This provides for a very stable lifting process. It may be noted, that the connecting means need not be exactly in the corners of the handling base but in a region of the corners. The region of corners includes a region including about 10% of the extension of the transport structure in each direction of its main extension.

In order to facilitate the lifting process according to the invention use can be made of a transport structure according to the invention comprising a lifting adaptor or a lifting tool, which extends at an angle, preferably essentially perpendicularly, from the main extension of the handling base from its upper side. To this adaptor ropes and/or chains can be attached which can then be connected to a lifting means such as a crane or a helicopter. In particular, a chain can be attached to the end of the lifting adaptor facing away from the handling base and possibly an additional chain can be attached to the other end of the lifting adaptor situated at its interface to the handling base. This way the transport structure can simply be placed from the transport position into a lifting position: in the transport position its main extension is orientated horizontally, whilst in the lifting position (which can often also be considered an assembly position of final assembly of the generator) the transport structure is orientated essentially vertically. At the same time, the generator automatically is put into such an orientation which is necessary for inserting it e.g. into a wind turbine. I.e., the axis of the generator is first (in the transport position) orientated vertically and then (in the lifting and assembly position) horizontally.

The lifting adaptor can for instance be placed at either longitudinal end of the transport structure, most preferably orientated in the middle of the cross extension. Alternatively, it may be placed in the middle of the longitudinal extension. Several adaptors may also be used. In order to facilitate transport the lifting adaptor can be detachably attached to the handling base. This makes it possible to take off the lifting adaptor during transport or storage of the transport assembly so that the lifting adaptor does not stand in the way during these times. Also, the lifting adaptor may be placed into an interface of the transport structure which can otherwise be used as an interface for a tractor (as mentioned above) and/or for rollers. To sum up, the transport structure is orientated and realized such that the transport structure can be moved from a position in which its main extension is essentially orientated in a horizontal way into a position in which its main extension is essentially orientated in a vertical way.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF INVENTION

Figure 1:
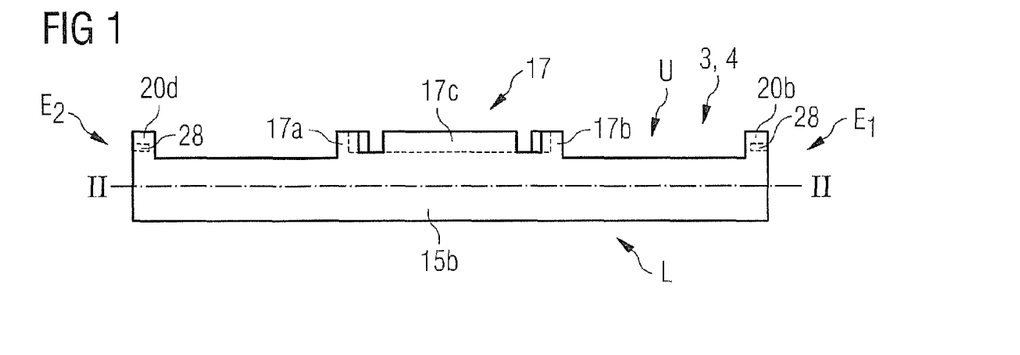
FIG. 1 shows a side of you off transport structure according to an embodiment of the invention.
Figure 2:
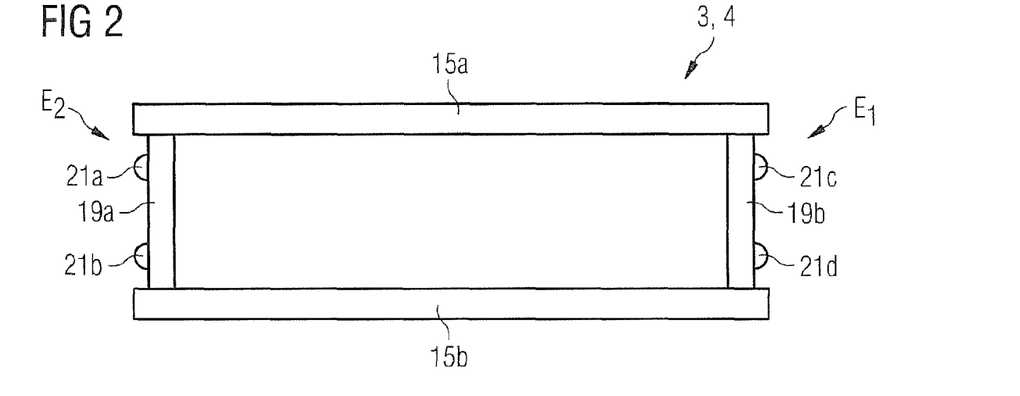
FIG. 2 shows a cross section of the same transport structure along the line II-II.
Figure 3:
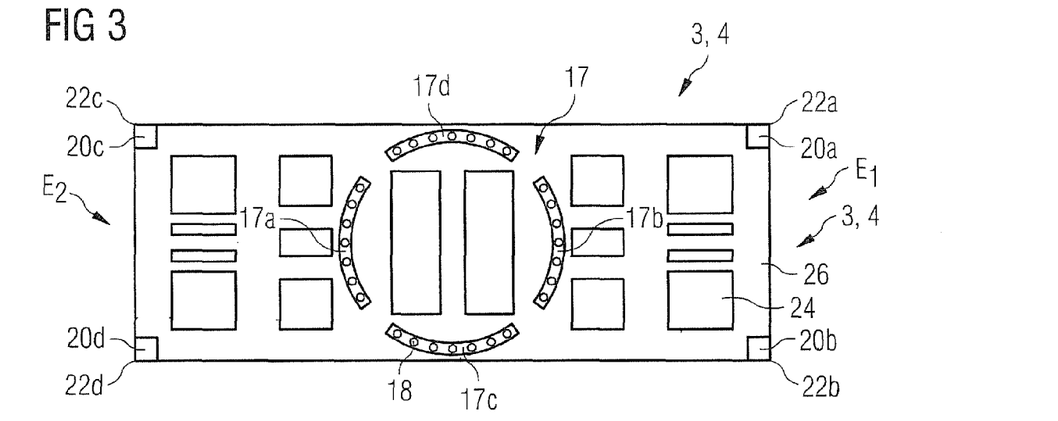
FIG. 3 shows a view of the same transfer structure from above onto its upper side.
Figure 6:
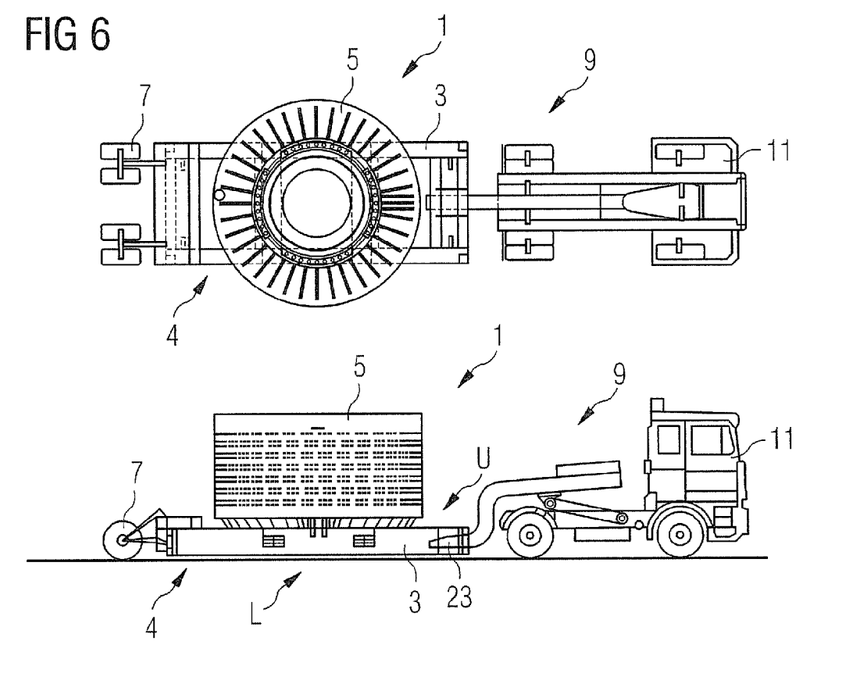
FIG. 6 shows the same transport assembly as in figure is four and five in a transport position in the context of an embodiment of the transport system according to the invention.
Figure 7:
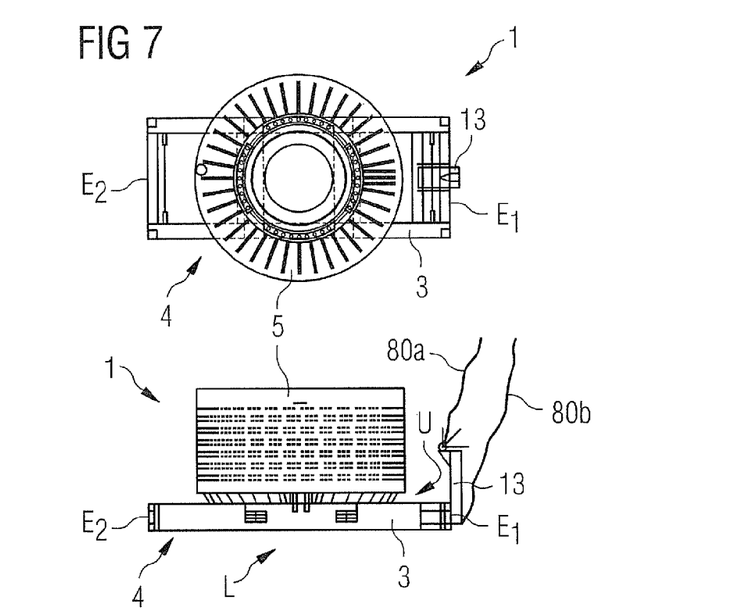
FIG. 7 shows the same transport assembly as in FIG. 4 and five in the same two views in a second situation in which it is ready for lifting.
Figure 8:
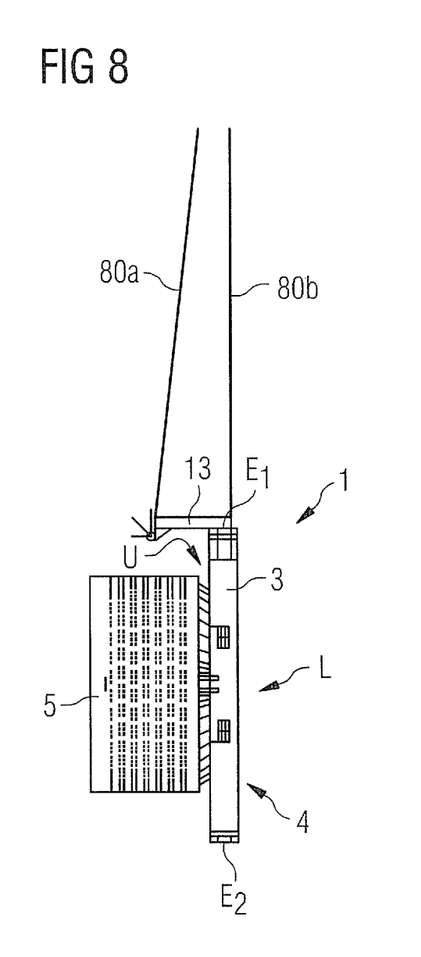
FIG. 8 shows the transport assembly of FIG. 7 during a lifting processors.

FIGS. 1 to 3 show a transport structure 4, which is realized on the basis of a handling base 3 in the form of a frame structure which may be equipped with additional features (cf. FIGS. 6 to 8). It comprises two longitudinal beams 15*a*, 15*b* which extend all alongside of the transport structure 4 from a first longitudinal end $E_1$ to a second longitudinal end $E_2$. The handling base 3 is essentially flat with an upper side U and a lower side L. On the upper side U facing away from the lower side L certain elements project upwards: firstly, in the regions of all four corners 22*a*, 22*b*, 22*c*, 22*d* of the transport structure 4 there are blocks 20*a*, 20*b*, 20*c*, 20*d*. In each of the blocks 20*a*, 20*b*, 20*c*, 20*d* there are inserted holes 28 which open in the direction of those longitudinal ends $E_1$, $E_2$ at which the respective blocks 20*a*, 20*b*, 20*c*, 20*d* are positioned. Secondly, an interface arrangement 17 projects from the upper side U of the handling base 3 in an upward direction. It comprises four shapes 17*a*, 17*b*, 17*c*, 17*d* which form a little less than a quarter of a circle segment and which are equipped with a number of holes 18 in which bolts can be inserted. For that purpose the holes 18 are equipped with bushings (not shown). The shapes 17*a*, 17*b*, 17*c*, 17*d* together form a circle which is only interrupted by some gaps in between them. As can be seen in FIG. 2, the handling base 3 is basically made up of the two longitudinal beams 15*a*, 15*b* and of two cross beams 19*a*, 19*b* which connect the longitudinal beams 15*a*, 15*b*. At each of the ends of the cross beams 19*a*, 19*b* there are brackets 21*a*, 21*b*, 21*c*, 21*d* which face in the direction of the longitudinal ends $E_1$, $E_2$ at which the respective cross beams 19*a*, 19*b* are positioned. In FIG. 3 it can be seen that above the longitudinal beams 15*a*, 15*b* and above the cross beams 19*a*, 19*b* there is positioned a cover structure 26 with a number of openings 24. This cover structure 26 provides for an easier access of users to the region of the interface arrangement 17 while the openings 24 can be used e.g. for fixing chains in the middle of the transport structure 4.

The transport structure 4 shown in these three figures provides for a firm detachable fixing of a generator on it via the interface arrangement 17: such generator can be placed into the middle of the interface arrangement 17 so that its inner perimeter is exactly placed around the shapes 17*a*, 17*b*, 17*c*, 17d, which permits for a close form fit. The holes 18 can be used for bolting the generator to the interface arrangement 17 and thus to the transport structure 4. For that purpose the interface arrangement 17 is firmly and permanently attached to the handling base 3 by welding. The transport structure 4 is designed such that it can be lifted by a lifting means and to be moved by a means of transport. For that purpose the holes 22 at either longitudinal ends $E_1$, $E_2$ serve as interfaces for rollers or a truck master (not shown—cf. FIG. 6) whereas the brackets 21a, 21b, 21c, 21d can be used for attaching chains or ropes and thus as connecting means for connecting the handling base 3 to a lifting device such as a crane or a helicopter.

Figure 4:
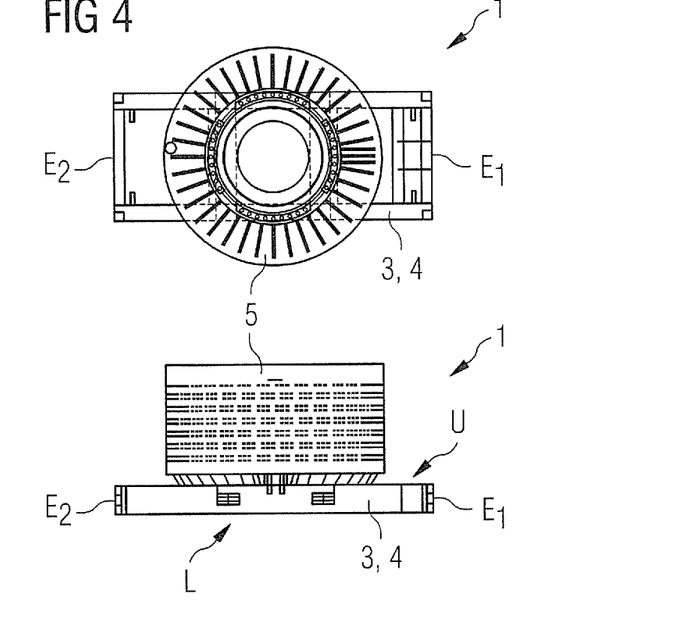
FIG. 4 shows a transport assembly according to an embodiment of the invention in a top view and a side view in a resting position.

FIG. 4 shows the same transport structure 4 together with a large scale direct drive generator 5 which is to be assembled in a wind turbine. Together, the transport structure 4 and the wind turbine 5 make up a transport assembly 1. As can be seen in the view from above, the diameter of the generator 5 is larger than the cross extension of the transport structure 4, whereas it is smaller than the longitudinal extension of the transport structure 4. The transport structure 4 has the same size as the base of a standard 20 ft transport container. Therefore, it can be positioned in a place in which normally a transport container of the same size would be positioned. Because of the overlap of the generator 5 in the cross extension it is not possible to place a transport container or another transport arrangement of the same kind directly in the neighbouring placement position for transport containers but rather in the next placement position after the neighbouring one. However, in the longitudinal extension transport containers can be placed directly adjacent to the transport assembly 1 into the next placement position for containers.

Figure 5:
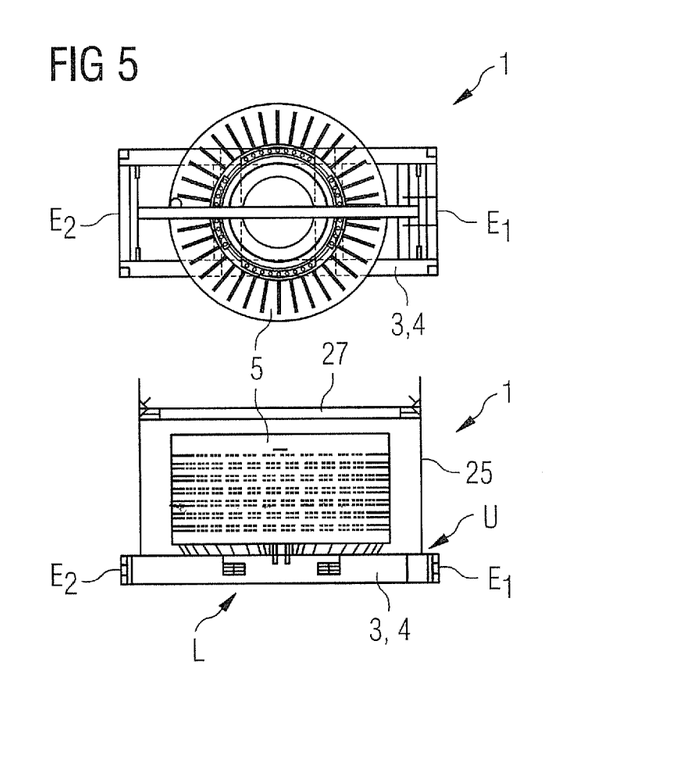
FIG. 5 shows the same transport assembly as in FIG. 4 in the same two views in a first situation in which it is ready for lifting.

FIG. 5 shows the same transport arrangement 1 in a situation in which it can be lifted for example by a crane or a helicopter. For that purpose chains 25 are attached to the brackets 21a, 21b, 21c, 21d (cf. FIG. 2). These chains 25 lead up to another longitudinal carrier beam 27 above the transport assembly 1 at which carrier beam 27 ropes or chains connecting to the crane or helicopter and can be attached. This carrier beam 27 serves to stabilize the transport structure 4 in its horizontally orientated position during a lifting process. Such lifting process serves e.g. to transport the transport assembly 1 from a storage position on ground on board of a ship.

FIG. 6 shows the same transport assembly 1 in connection with two sets of rollers 7 at the second longitudinal end $E_2$ and with a tractor 11 at its first longitudinal end $E_1$. The tractor 11 has a raising device (not shown) serving to raise the transport frame 4 above ground at its first longitudinal end $E_1$. The rollers 7 have been inserted into the holes 22 (cf. FIG. 1) at the second longitudinal end $E_2$. By a hydraulic raising system (not shown) connected to the rollers 7, the second longitudinal end $E_2$ has been lifted so that the transport structure 4, i.e. its upper side U is orientated horizontally. Alternatively, the transport structure 4 can also be lifted by a forklift at either longitudinal $E_1$, $E_2$ above ground. As an effect, at either longitudinal ends $E_1$, $E_2$ the transport structure 4 is above ground and can now be torn away by means of the tractor 11 and with the help of the rollers 7. This overall assembly (comprising the transport assembly 1 including the rollers 7 and the tractor 11) makes up a transport system 9.

FIG. 7 shows the same transport assembly 1 as in FIGS. 4 and 5, however now equipped with a lifting adaptor 13 at its first longitudinal end $E_1$. The lifting adaptor 13 projects into the direction of the generator 5, i.e. away from the upper side U. At its top end facing away from the transport structure 4 there is attached a first chain 80a leading to a helicopter (not shown) and at its lower end which is adjacent to the handling base 3 there is attached a second chain 80b also leading to the helicopter.

FIG. 8 depicts the same transport structure 4 as in FIG. 7, however in a lifting position or assembly position. This means that now the chains 80a, 80b have been turned up by the helicopter so that they carry up the transport structure 4 into the air. Because of the orientation of the lifting adaptor 13 perpendicular to the main extension of the transport structure 4 and because of the chains 80a, 80b which are attached to the lifting adaptor 13 the transport structure has been turned in the air into a vertical position. That means that the middle axis of the circular shape of the generator 5 is now horizontally orientated whereas previously it had been orientated vertically. The helicopter or crane or any other lifting means can now lift up the transport assembly 1, i.e. both the transport structure 4 and the generator 5, to a nacelle of a wind turbine. Thereby, the generator 5 is already orientated in such a way as it is ready to be assembled to the nacelle of the wind turbine. After the assembly of the generator 5 to the nacelle of the wind turbine the bolts in the holes 18 (cf. FIG. 2) can be taken out so that the connection between the transport structure 4 and the generator 5 is ended. The transport structure 4 can then be returned to the ground and the lifting adaptor 13 may be taken off again. The transport structure 4 can then be reused.

Figure 9:
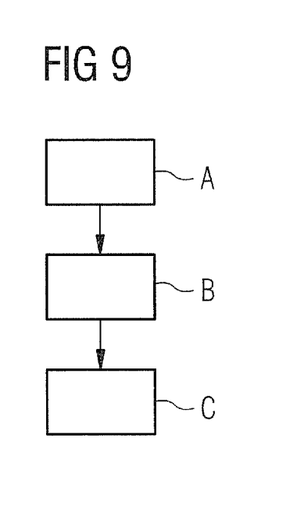
FIG. 9 shows the schematic block view of the steps of the transport and lifting procedure according to embodiments of the methods according to the invention.

FIG. 9 shows in a schematic block view three principal steps of a transport method and of a lifting method according to embodiments of the invention with reference to the previous figures. In a step A the generator 5 is attached to the transport structure 4 via the interface arrangement 17. The transport structure 4 together with the generator 5, i.e. the transport assembly 1, is then moved in a step B, i.e. transported by a means of transport. These two steps A and B constitute the steps of the method for transporting the generator according to an embodiment of the invention. Furthermore, in the step C, the transport assembly 1 is moved from a transport position, i.e. the position in which the main extension of the transport structure 4 is essentially a horizontal one, into a lifting position. In the lifting position the main extension of the transport structure 4 is essentially vertical. Steps A and C together constitute steps in the context of an embodiment of a lifting method according to the invention. The transport and lifting methods described here may include several steps of storage, internal transport, road transport, e.g. on container trucks, sea transport, e.g. on container vessels, lifting, upending and installating the generator 5. This means that one, some or all of these steps may occur once or may repeat itself/themselves once or even several times with at least one other of these steps in between.

For the sake of clarity, it is to be understood that the use of "a" or "an" throughout this application does not exclude a plurality, and "comprising" does not exclude other steps or elements.

The invention claimed is:

1. A transport structure configured to transport and/or lift a large scale generator, comprising
   a handling base comprising an upper side and a lower side, and a first longitudinal end and second longitudinal end,
   an interface arrangement at the handling base realized such that the large scale generator is releasably attached to the handling base in the direction of the upper side; and
   a lifting adaptor extending at an angle from the first longitudinal end of the handling base beyond the upper side, the lifting adaptor effective to support the handling base when the transport structure is suspended off the ground, wherein the lifting adaptor is orientated and realized such that the transport structure is movable from a position in which its main extension is essentially orientated in a horizontal way into a position in which its main extension is essentially orientated in a vertical way.

2. The transport structure according to claim 1 wherein the interface arrangement comprises fittings, holes and adaptor shapes which correspond to a shape, position to a shape and position of the generator to be transported at an interface side of the generator facing towards the upper side of the handling base.

3. The transport structure according to claim 1 wherein the interface arrangement comprises at least one element selected from the group consisting of fitting, holes and adaptor shape which correspond to at least one feature of the generator to be transported, the feature at an interface side of the generator facing towards the upper side of the handling base, the feature selected from the group consisting of shape, position to a shape, and position of the generator to be transported.

4. The transport structure according to claim 1, wherein the handling base comprises at least one longitudinal beam and at least one cross beam orientated in an essentially perpendicular way to the longitudinal beam.

5. The transport structure according to claim 1, wherein the handling base is essentially sized like a base of a standard transport container.

6. The transport structure according to claim 5, wherein the set of rollers is attached detachably to the handling base.

7. The transport structure according to claim 5, wherein an interface configured to attach the handling base to a tractor is arranged at the first longitudinal end.

8. The transport structure according to claim 1, wherein a set of rollers is attached at the second longitudinal end.

9. The transport structure according to claim 1, further comprising:
a connecting means configured to connect the handling base to a lifting device.

10. The transport structure according to claim 9, wherein the connecting means are situated in a region of corners of the handling base.

11. A transport assembly, comprising:
a transport structure according to claim 1; and
a large scale generator attached to the transport structure via the interface arrangement.

12. The transport structure according to claim 1, wherein when the transport structure is oriented in the essentially vertical position the lifting adaptor is arranged vertically above the handing base.

13. The transport structure according to claim 1, wherein the lifting adaptor is configured to attach to a lifting apparatus effective to lift the transport structure off the ground.

14. A method of transporting a large scale generator, comprising:
attaching the generator to a transport structure according to claim 1, the attaching via the interface arrangement of the transport structure and in the direction of an upper side of the transport structure; and
moving the transport structure with the attached generator.

15. The method according to claim 14, wherein the moving includes moving the transport structure from a position in which its main extension is essentially orientated in a horizontal way into a position in which its main extension is essentially orientated in a vertical way.

16. The method according to claim 15, comprising:
attaching a cable to the lifting adaptor; and
lifting the transport structure by the cable such that the transport structure is suspended from the ground.

* * * * *